United States Patent
Dunigan

(10) Patent No.: US 8,393,686 B2
(45) Date of Patent: Mar. 12, 2013

(54) HOIST EMPLOYING A MULTIPLE PISTON CYLINDER

(75) Inventor: R. Clay Dunigan, Benson, NC (US)

(73) Assignee: Gladiator Equipment LLC, Fayetteville, NC (US)

( * ) Notice: Subject to any disclaimer, the term of this patent is extended or adjusted under 35 U.S.C. 154(b) by 163 days.

(21) Appl. No.: 12/860,656

(22) Filed: Aug. 20, 2010

(65) Prior Publication Data

US 2011/0031802 A1 Feb. 10, 2011

Related U.S. Application Data

(63) Continuation-in-part of application No. 12/179,339, filed on Jul. 24, 2008, now abandoned.

(51) Int. Cl.
*B60P 1/16* (2006.01)

(52) U.S. Cl. .................................................. 298/22 R

(58) Field of Classification Search ............... 298/17 R, 298/22 P, 22 B, 22 D; 137/596, 565.01; 60/403; 239/657

See application file for complete search history.

(56) References Cited

U.S. PATENT DOCUMENTS

| | | | |
|---|---|---|---|
| 2,077,534 A | 4/1937 | Sell | |
| 2,106,484 A | 1/1938 | Hewitt | |
| RE20,812 E | 7/1938 | Wood | |
| 2,148,616 A | 2/1939 | Gruber | |
| 2,381,425 A | 8/1945 | Deal et al. | |
| 2,490,532 A | 12/1949 | Maxon | |
| 2,495,869 A | 1/1950 | Schroeder | |
| 2,534,590 A * | 12/1950 | Gerhardt | 123/52.5 |
| 2,620,225 A | 12/1952 | Hutchinson | |
| 2,842,396 A | 7/1958 | Fayette et al. | |
| 2,981,234 A | 4/1961 | Appleton | |

(Continued)

FOREIGN PATENT DOCUMENTS

DE 202004002221 U1 * 5/2004
EP 0 561 074 A1 9/1993

(Continued)

OTHER PUBLICATIONS

Recommended Practice for Application Guidelines of Cylinders, Apr. 9, 1998, National Fluid Power Association, Inc.

*Primary Examiner* — H Gutman
(74) *Attorney, Agent, or Firm* — Myers Bigel Sibley & Sajovec, PA

(57) ABSTRACT

A vehicle includes a vehicle chassis, a load support body connected to the chassis and movable between a lowered position and a raised position, and a hoist operable to forcibly move the load support body from the lowered position to the raised position. The hoist includes a cylinder and a pressurized drive fluid supply system. The cylinder includes a housing assembly and a shaft assembly. The housing assembly defines first and second cylinder chambers separated by a center cap. The shaft assembly is slidably mounted in the housing assembly and includes a shaft and first and second pistons affixed to the shaft at axially spaced apart locations along the shaft. The first piston is disposed in the first cylinder chamber and the second piston is disposed in the second cylinder chamber. The pressurized drive fluid supply system is operable to supply a pressurized fluid into each of the first and second cylinder chambers to forcibly extend the shaft assembly relative to the housing assembly in an extension direction to forcibly move the load support body from the lowered position to the raised position. The cylinder is configured such that, when the shaft assembly is fully extended, a volume of the pressurized drive fluid in the second cylinder chamber exerts an offset force on the center cap in a direction opposite the extension direction to offset axially expansive counter-forces on the cylinder housing.

15 Claims, 12 Drawing Sheets

U.S. PATENT DOCUMENTS

| | | | |
|---|---|---|---|
| 2,983,256 A | 5/1961 | Seeloff | |
| 2,983,257 A | 5/1961 | Euga | |
| 3,145,056 A | 8/1964 | Blahnik | |
| 3,149,537 A * | 9/1964 | Fink | 91/178 |
| 3,314,594 A | 4/1967 | Rietdijk | |
| 3,328,047 A | 6/1967 | Bugyie | |
| 3,620,458 A | 11/1971 | Rath | |
| 3,683,619 A * | 8/1972 | Belart | 60/549 |
| 3,700,360 A * | 10/1972 | Shaddock | 417/404 |
| 3,777,857 A * | 12/1973 | Hughes | 188/170 |
| 3,791,695 A | 2/1974 | Seniuk | |
| 3,889,517 A * | 6/1975 | Eppler | 72/270 |
| 4,010,630 A | 3/1977 | Davis, Jr. et al. | |
| 4,019,781 A | 4/1977 | Ray | |
| 4,046,423 A | 9/1977 | Ordonez | |
| 4,111,316 A | 9/1978 | Wappler | |
| 4,135,076 A * | 1/1979 | Beneteau | 219/89 |
| 4,148,528 A | 4/1979 | Channell | |
| 4,382,632 A | 5/1983 | Pitts | |
| 4,568,028 A | 2/1986 | Verseef et al. | |
| 4,627,795 A * | 12/1986 | Schmitz-Montz | 417/267 |
| 4,697,499 A | 10/1987 | Dirkin et al. | |
| 4,762,370 A | 8/1988 | Corompt et al. | |
| 4,766,820 A | 8/1988 | Ritter et al. | |
| 4,773,306 A | 9/1988 | Dirkin | |
| 4,836,092 A | 6/1989 | Heubner et al. | |
| 4,951,999 A | 8/1990 | Rudolph et al. | |
| 5,016,522 A | 5/1991 | Allardin | |
| 5,048,896 A | 9/1991 | Channell | |
| 5,141,288 A | 8/1992 | Smith | |
| 5,327,768 A * | 7/1994 | Yamashita | 72/405.09 |
| 5,513,901 A | 5/1996 | Smith et al. | |
| 5,615,595 A * | 4/1997 | Davis | 91/440 |
| 5,778,760 A | 7/1998 | Yuda | |
| 6,409,275 B1 | 6/2002 | Gerding | |
| 6,582,024 B2 | 6/2003 | Hicks | |
| 6,604,451 B1 | 8/2003 | Yasuda | |
| 6,619,620 B1 | 9/2003 | Carter | |
| 6,976,740 B1 | 12/2005 | Hollinrake et al. | |
| 7,182,406 B2 | 2/2007 | Ahlberg | |
| 7,309,112 B2 | 12/2007 | Isono | |
| 2003/0029311 A1 | 2/2003 | Haerr et al. | |
| 2008/0014101 A1 * | 1/2008 | Hartung et al. | 417/384 |
| 2010/0019561 A1 | 1/2010 | Dunigan | |

FOREIGN PATENT DOCUMENTS

| | | |
|---|---|---|
| EP | 1422012 A1 * | 5/2004 |
| GB | 306 774 | 2/1929 |
| JP | 06323305 A * | 11/1994 |

* cited by examiner

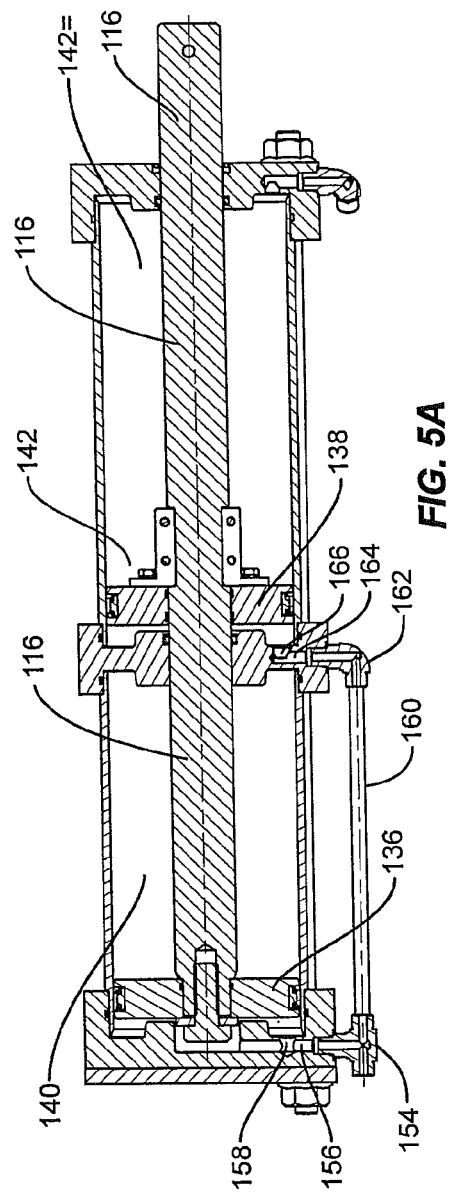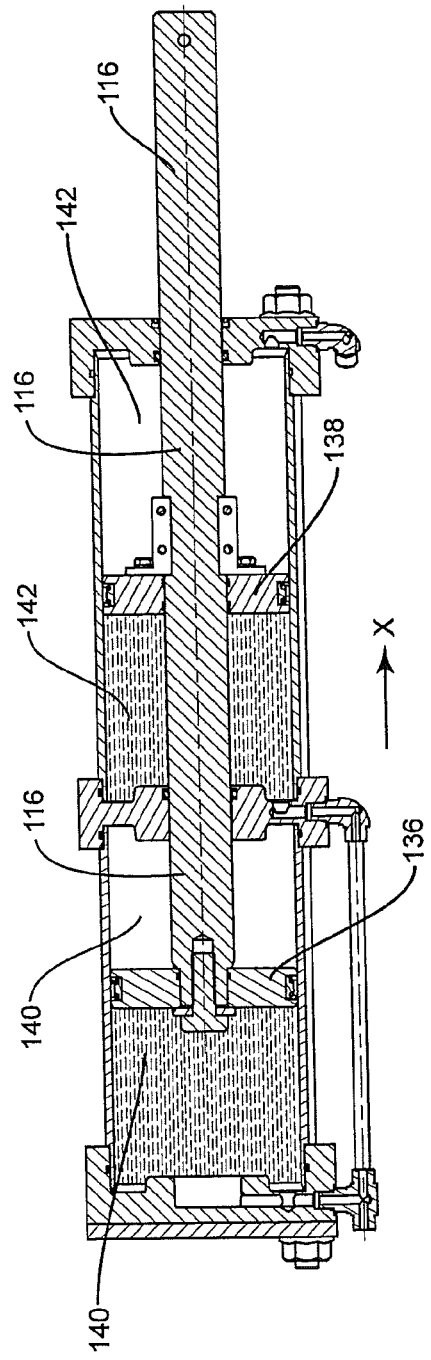

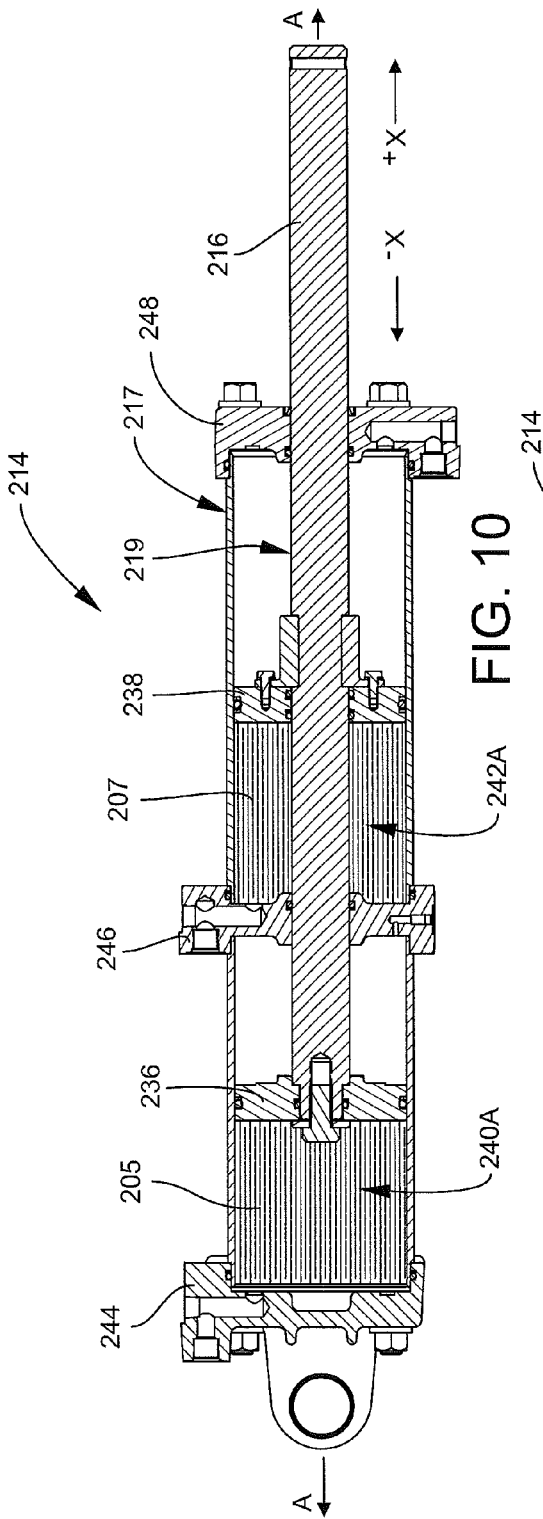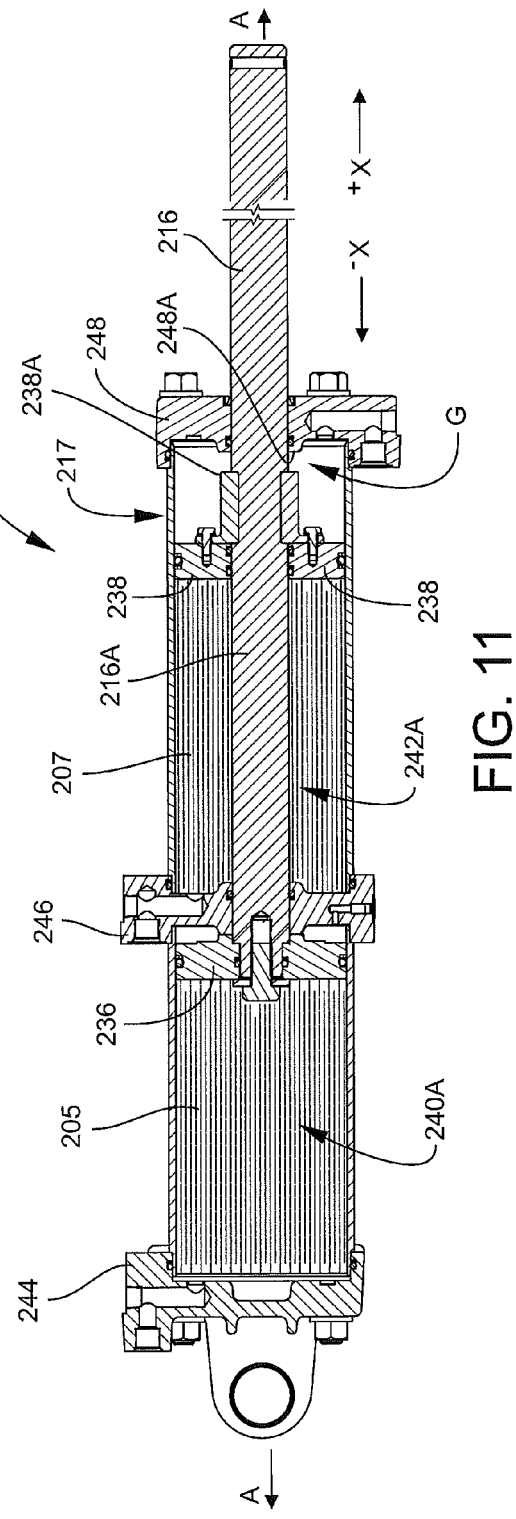

ated the linear force, a length $L_1$ of
HOIST EMPLOYING A MULTIPLE PISTON CYLINDER

RELATED APPLICATION(S)

This is a continuation-in-part (CIP) application of and claims priority from U.S. patent application Ser. No. 12/179,339, filed Jul. 24, 2008 now abandoned, the disclosure of which is incorporated herein by reference in its entirety.

FIELD OF THE INVENTION

The present invention relates to hoists and more particularly to hoists employing at least one multiple piston cylinder.

BACKGROUND OF THE INVENTION

Vehicles having a dump body typically employ a hoist. The hoist imparts a force on the dump body to tilt the dump body from a resting position to a dumping position. The ability of the hoist to impart a rotational force on a dump body dictates how much weight the dump body may hold. The greater the rotational force imparted by the hoist, the greater amount of weight the dump body may hold.

For example, FIG. 1 illustrates a typical hoist 10 employing a cylinder 12 coupled with a torque arm 14, and a lift arm 16 coupled with the torque arm 14. The lift arm 16 couples with a dump body 18 such that when the lift arm 16 moves, the dump body 18 also moves. During operation, the cylinder 12 moves in a direction defined by a directional arrow X, thereby imparting a linear force along direction X on the torque arm 14. The linear force causes the torque arm 14 to rotate, thereby creating a moment $M_1$ about an endpoint 20 of the torque arm 14. The rotation of the torque arm 14 causes the lift arm 16 to generally move in an upward direction Y. As the torque arm 14 rotates, the lift arm 16 moves the dump body 18 from a first position (not shown) to a second position.

The hoist 10 creates two forces while moving the dump body 18: a linear force along the direction X and the moment $M_1$. If it is desired to increase the rotational force imparted by the hoist 10 such as to increase the dump body 18 capacity, the linear force may be increased or the moment $M_1$ may be increased independent of the linear force. The cylinder 12 imparts the linear force through hydraulic pressure. In particular, pressurized fluid is fed into a piston 22 of the cylinder 12, which causes movement of a shaft 24. The pressurized fluid imparts the linear force along the shaft 24, which is translated to the torque arm 14. Thus, if the pressure of the pressurized fluid increases, the linear force imparted by the pressurized fluid also increases. However, in some applications, there are pressure rating limits for the piston 22. For example, pressurized fluid may not be fed into the piston 22 at more than 3000 psi in a hydraulic application. Otherwise, various components of the piston, such as seals, or the like, may prematurely wear, thereby causing failure of the hoist 10.

Furthermore, the overall dimensions of the cylinder 12 and the piston 22 may be increased by increasing a diameter of both the cylinder 12 and the piston 22 such that more pressurized fluid may be fed into the cylinder 12. However, when the diameters of the cylinder 12 and the piston 22 are increased, an overall size of the cylinder 12 also increases. Thus, the cylinder 12 may interfere with components of vehicle implementing the hoist, such as exhaust components, drivetrain components, powertrain components, and the like.

The moment $M_1$ acting about the endpoint 20 of the torque arm 14, may be increased independent of increasing of the linear force to increase rotational force. In order to increase the moment $M_1$ independent of the linear force, a length $L_1$ of the torque arm 14 may be increased. Nonetheless, increasing the length $L_1$ of the torque arm 14 increases the overall dimensions of the hoist 10. Thus, the hoist 10, which typically resides within a chassis of a vehicle having the dump body 18, may interfere with other components of the vehicle, such as the exhaust system, the differential, the suspension, or the like, of the vehicle.

Accordingly, what is needed is a hoist that can impart greater rotational forces to a dump body. Moreover, the hoist should have compact dimensions, such that the hoist does not interfere with other components of a vehicle using the hoist.

SUMMARY OF THE INVENTION

Embodiments of the present invention provide a hoist employing at least one multiple piston cylinder to increase linear force. The hoist can be employed in a vehicle to tilt a dump body disposed on the vehicle such that media held by the dump body discharges when the dump body tilts. The hoist includes at least one cylinder having multiple pistons disposed on a single cylinder shaft, which increase the linear force imparted by the cylinder. In this manner, for example, a greater linear force may be achieved that may be possible given piston pressure rating limits for a particular application and/or moment limitations. For example, this may allow the hoist to reside substantially above a chassis of the vehicle such that the hoist does not interfere with components residing within the vehicle chassis, such as exhaust components, suspension hangers, fuel tanks, power train components, and the like, while still imparting a greater linear force. In further embodiments, the hoist may include two or more cylinders having multiple pistons, such that the hoist may tilt the dump body having heavier loads.

The multiple pistons allow for the use of a pressurized fluid having a pressure which does not cause the premature failure of components due to excessively high pressures, such as pressures exceeding 3000 psi. Furthermore, by using a cylinder having multiple pistons disposed on the same cylinder shaft, the overall dimensions of the cylinder are similar to a cylinder having a single piston.

According to embodiments of the present invention, a vehicle includes a vehicle chassis, a load support body connected to the chassis and movable between a lowered position and a raised position, and a hoist operable to forcibly move the load support body from the lowered position to the raised position. The hoist includes a cylinder and a pressurized drive fluid supply system. The cylinder includes a housing assembly and a shaft assembly. The housing assembly defines first and second cylinder chambers separated by a center cap. The shaft assembly is slidably mounted in the housing assembly and includes a shaft and first and second pistons affixed to the shaft at axially spaced apart locations along the shaft. The first piston is disposed in the first cylinder chamber and the second piston is disposed in the second cylinder chamber. The pressurized drive fluid supply system is operable to supply a pressurized fluid into each of the first and second cylinder chambers to forcibly extend the shaft assembly relative to the housing assembly in an extension direction to forcibly move the load support body from the lowered position to the raised position. The cylinder is configured such that, when the shaft assembly is fully extended, a volume of the pressurized drive fluid in the second cylinder chamber exerts an offset force on the center cap in a direction opposite the extension direction to offset axially expansive counter-forces on the cylinder housing.

According to embodiments of the present invention, a hoist for use with a pressurized drive fluid supply system includes a cylinder. The cylinder includes a housing assembly and a shaft assembly. The housing assembly defines first and second cylinder chambers separated by a center cap. The shaft assembly is slidably mounted in the housing assembly and includes a shaft and first and second pistons affixed to the shaft at axially spaced apart locations along the shaft. The first piston is disposed in the first cylinder chamber and the second piston is disposed in the second cylinder chamber. The cylinder is configured to receive and direct a pressurized drive fluid from the pressurized drive fluid supply system into each of the first and second cylinder chambers to forcibly extend the shaft assembly relative to the housing assembly in an extension direction. The cylinder is configured such that, when the shaft assembly is fully extended, a volume of the pressurized drive fluid in the second cylinder chamber exerts an offset force on the center cap in a direction opposite the extension direction to offset axially expansive counter-forces on the cylinder housing.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

FIG. 5A is an embodiment of the present invention showing another view of the cylinder illustrated with reference to FIG. 4;

FIG. 5B shows the operation of the cylinder illustrated with reference to FIG. 4, in accordance with an embodiment of the present invention;

FIG. 10 is a cross-sectional view of the hoist of FIG. 8 taken along the line 9-9, wherein the hoist is in a second, partially extended position; and FIG. 11 is a cross-sectional view of the hoist of FIG. 8 taken along the line 9-9, wherein the hoist is in a third, fully extended position.

DETAILED DESCRIPTION OF EMBODIMENTS OF THE INVENTION

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Embodiments of the present invention provide a hoist employing at least one multiple piston cylinder to increase linear force. The hoist can be employed in a vehicle to tilt a dump body disposed on the vehicle such that media held by the dump body discharges when the dump body tilts. The hoist includes at least one cylinder having multiple pistons disposed on a single cylinder shaft, which increase the linear force imparted by the cylinder. In this manner, a greater linear force may be achieved that may be possible given piston pressure rating limits for a particular application and/or moment limitations. This may allow the hoist to reside substantially above a chassis of the vehicle such that the hoist does not interfere with components residing within the vehicle chassis, such as exhaust components, suspension hangers, fuel tanks, power train components, and the like, while still imparting a greater linear force. In further embodiments, the hoist may include two or more cylinders having multiple pistons, such that the hoist may tilt the dump body having heavier loads.

Figure 1:
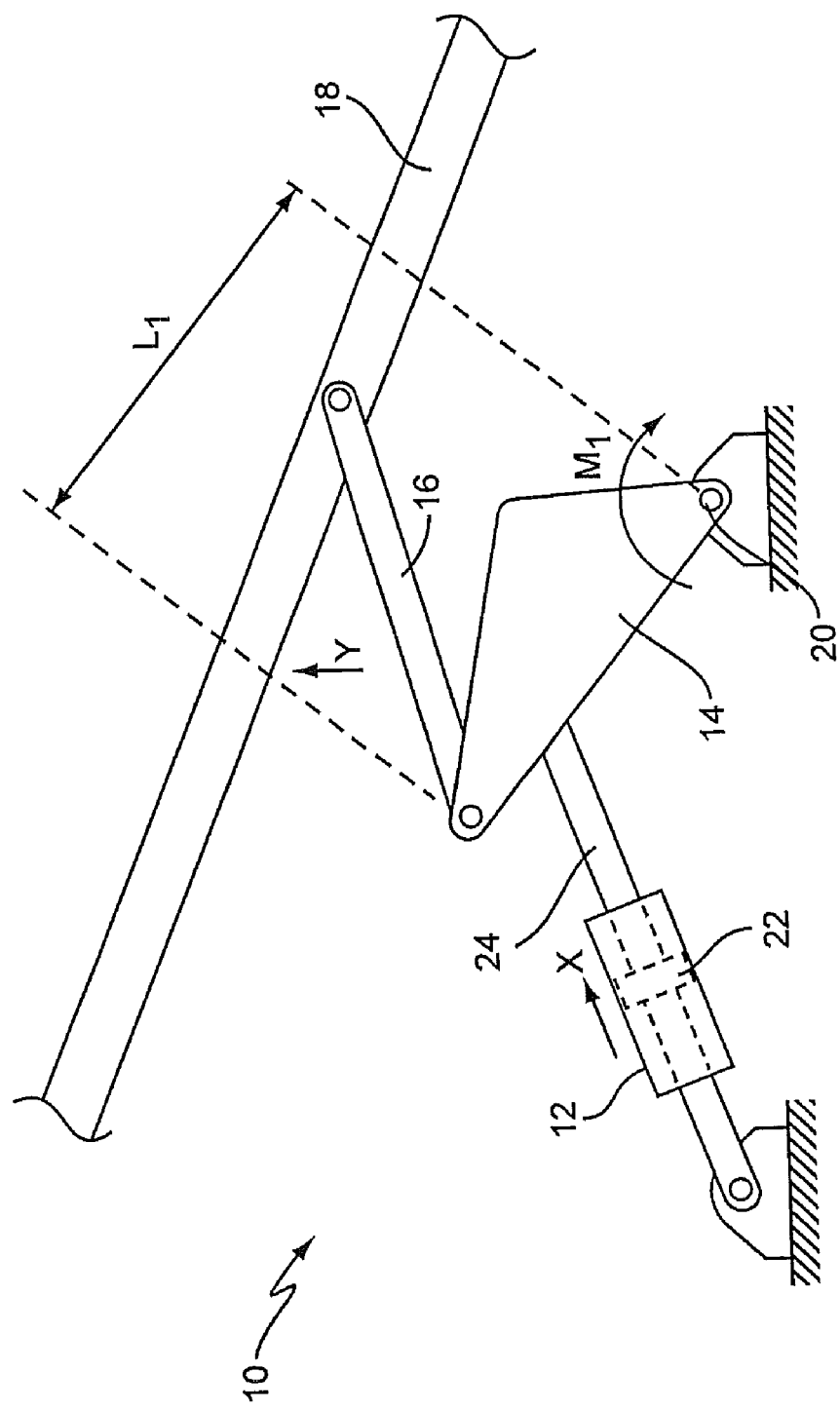
FIG. 1 illustrates the operation of a hoist in accordance with the prior art.
Figure 2:
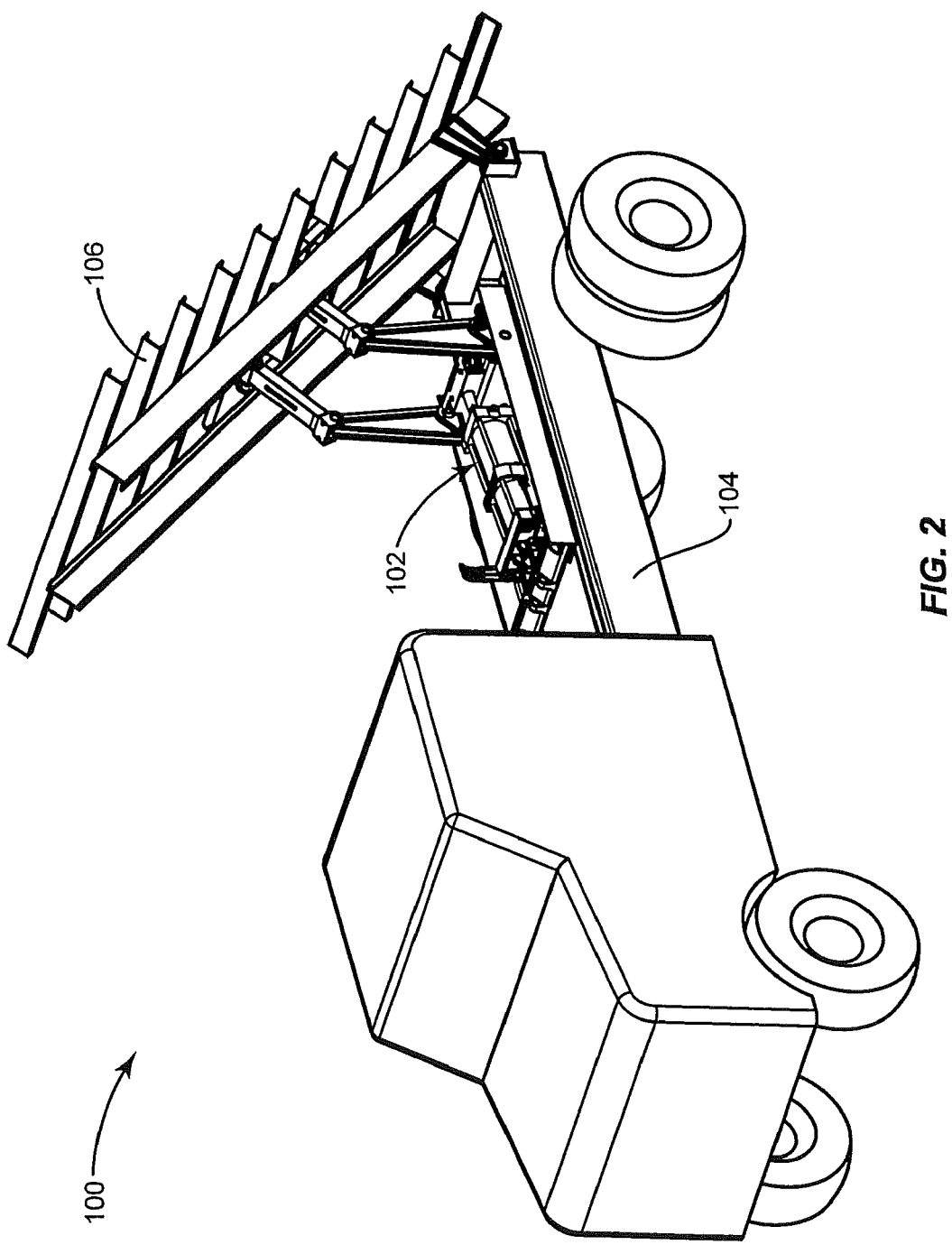
FIG. 2 illustrates a vehicle, which uses a hoist of the present invention.

Prior to discussing the particular aspects of embodiments of the present invention, an environmental view of an exemplary application of a hoist employing multiple pistons is illustrated with reference to FIG. 2. FIG. 2 illustrates a vehicle 100 which employs a hoist 102. It should be noted that while the hoist 102 is shown with a vehicle 100, the hoist 102 is not limited to either vehicle or dump applications. The hoist 102 is disposed above a vehicle chassis 104 of the vehicle 100 and couples with a load support body such as a dump body 106 of the vehicle 100. The hoist 102 has imparted both a linear force and a moment which in turn caused the dump body 106 to tilt upward, such that the dump body 106 can discharge media (not shown) disposed thereon. In this example, the hoist 102 can tilt the dump body 106 at an angle between about 0 degrees and about 50 degrees in order to facilitate media discharge.

Figure 3A:
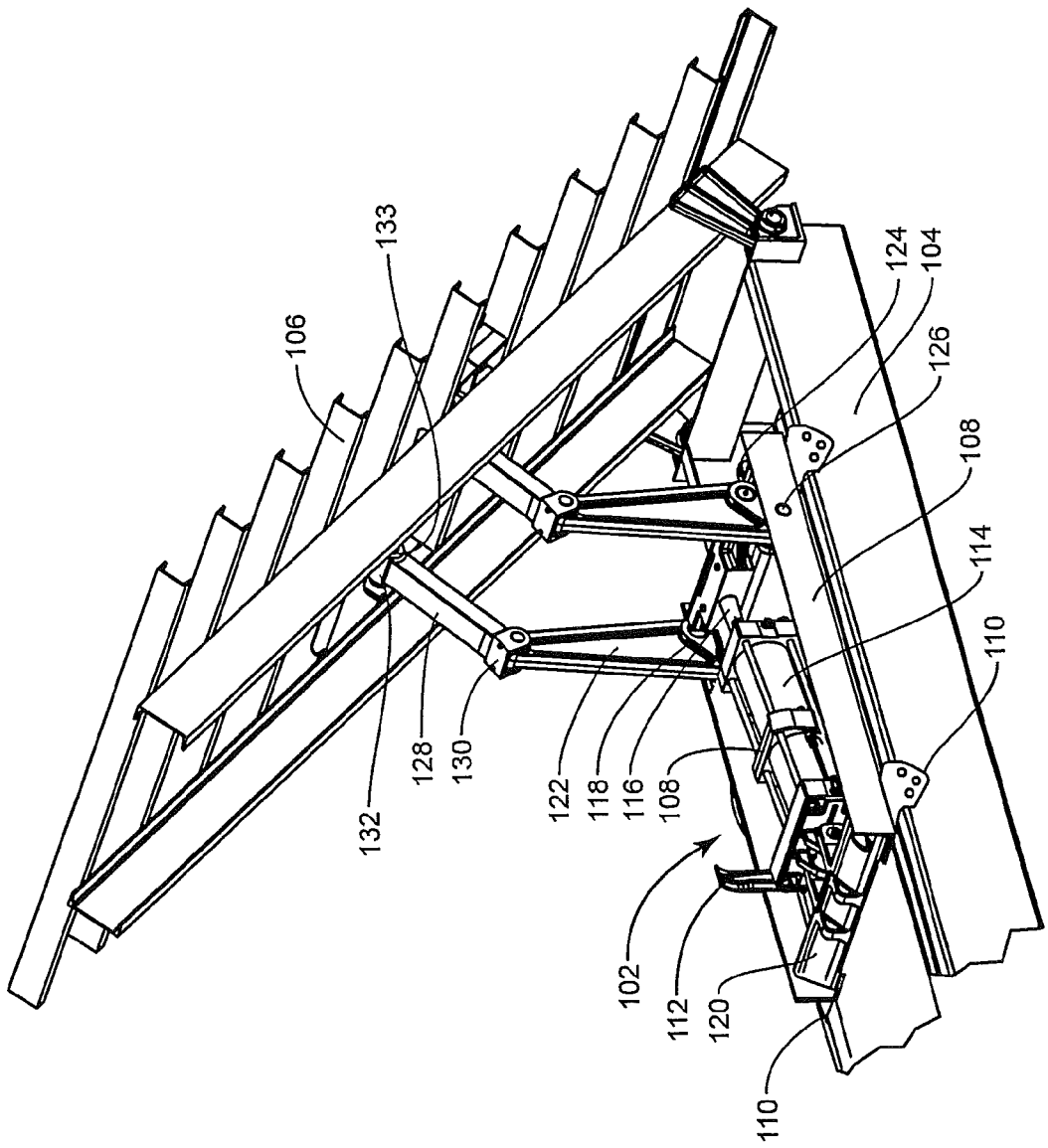
FIG. 3A is an embodiment of the present invention illustrating the hoist shown with respect to FIG. 2.
Figure 3B:
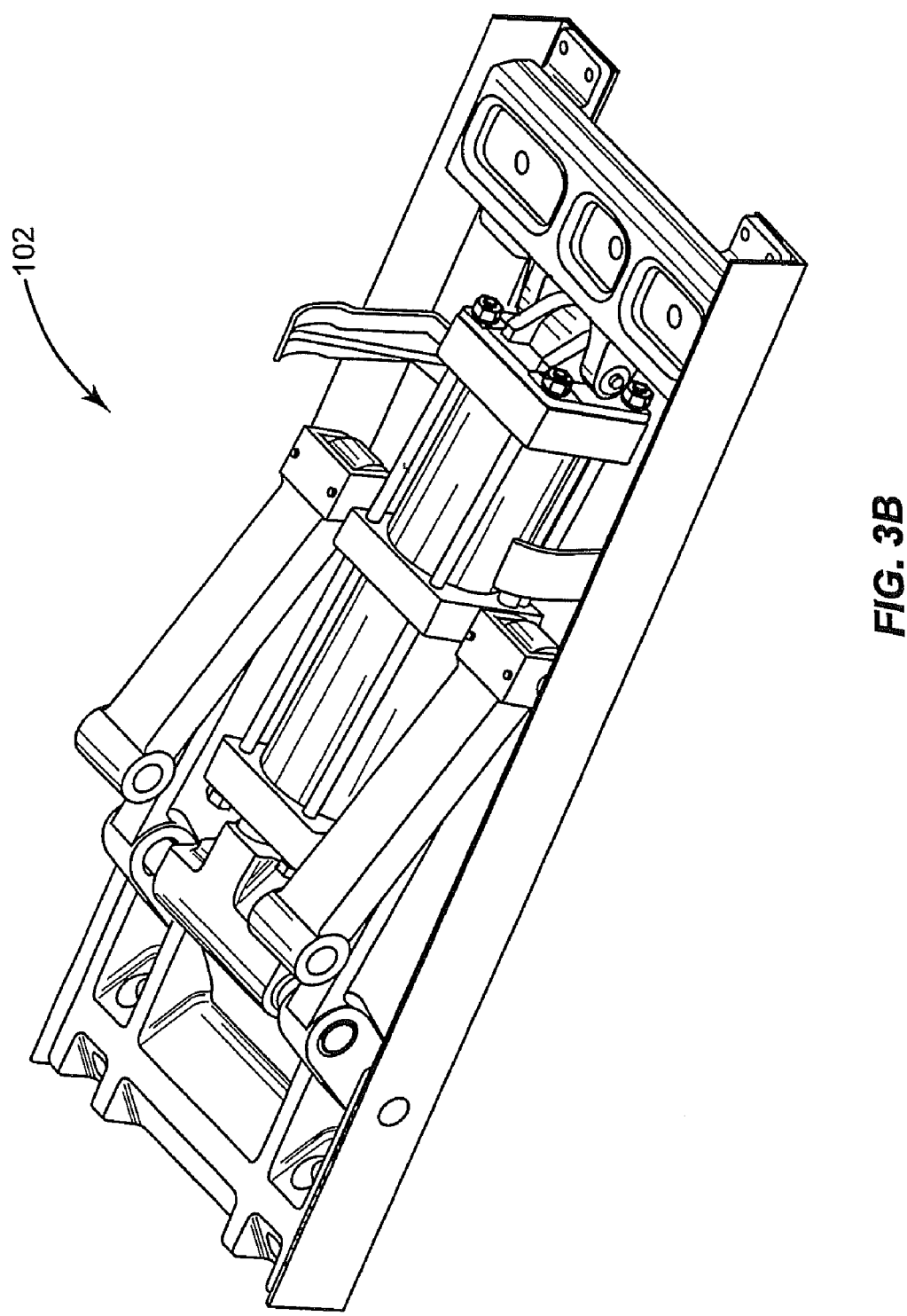
FIG. 3B shows the hoist shown with reference to FIG. 2 in a resting position in accordance with an embodiment of the present invention.

FIG. 3A illustrates the hoist 102 of FIG. 2 in greater detail. The hoist 102 includes a hoist frame 108, which couples the hoist 102 to the vehicle chassis 104. Hoist frame brackets 110 are employed to couple the hoist frame 108 to the vehicle chassis 104. In particular, the hoist frame brackets 110 couple the hoist frame 108 to the vehicle chassis 104 such that the hoist 102 is disposed above the vehicle chassis 104. The hoist 102 also includes a body guide 112, which guides the dump body 106 into position when the hoist 102 is in a resting position, as shown with reference to FIG. 3B. The hoist 102 is typically in a rest position when the dump body 106 is filled with media or when the vehicle 100 is in motion.

Figure 4:
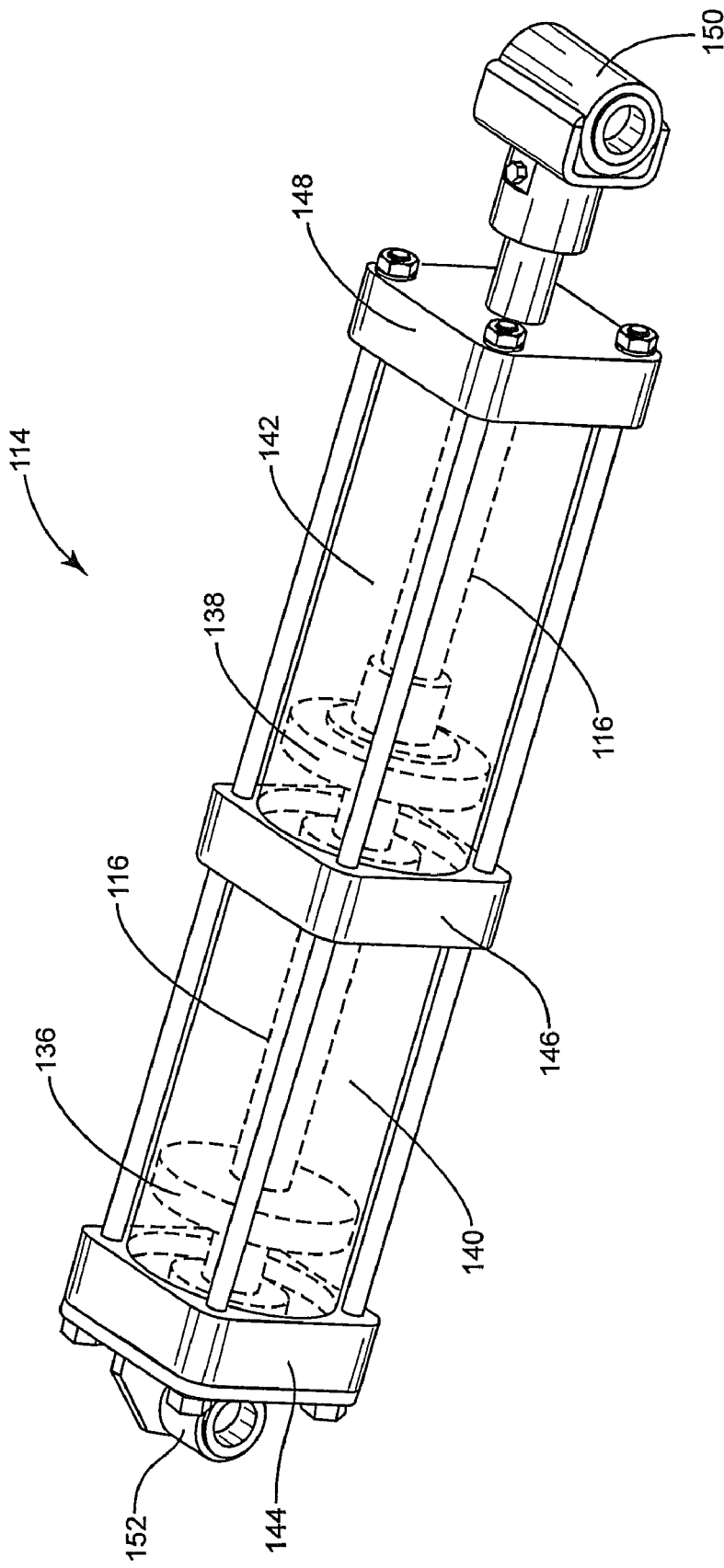
FIG. 4 shows a detailed view of a cylinder of the hoist shown with reference to FIG. 2, in accordance with an embodiment of the present invention.

The hoist 102 illustrated in FIG. 3A also includes a cylinder 114 having a cylinder shaft 116 coupled to a cylinder yoke 118. As will be discussed in greater detail below with reference to FIGS. 4, 5A, and 5B, the cylinder 114 includes multiple pistons. Furthermore, the hoist 102 is shown as having a single cylinder 114 where the cylinder includes multiple pistons. However, the hoist 102 may employ multiple cylinders, where each cylinder of the multiple cylinders includes multiple pistons. The hoist 102 also includes a lower bunk 120 with which the cylinder 114 couples. The cylinder yoke 118 couples with a torque arm 122 via a cylinder yoke pivot 124. The cylinder yoke pivot 124 may be any coupling member which rotatably couples the cylinder yoke 118 with the torque arm 122, such as a wrist pin for example, or the like. The torque arm 122 couples with the hoist frame 108 at a torque arm pivot point 126. The torque arm pivot point 126 may include a wrist pin, or any other type of device, which facilitates rotational coupling.

The torque arm 122 also couples with a lift arm 128 via a pivot 130. The lift arm 128 couples with the dump body 106 via a lift arm pivot 132. The lift arm pivot 132 rotatably couples the lift arm 128 with the dump body 106, using a coupling member 133, such as a wrist pin for example, or the like. Thus, during rotation of the torque arm 122, the lift arm 128 also rotates, thereby moving the dump body 106.

Figure 3C:
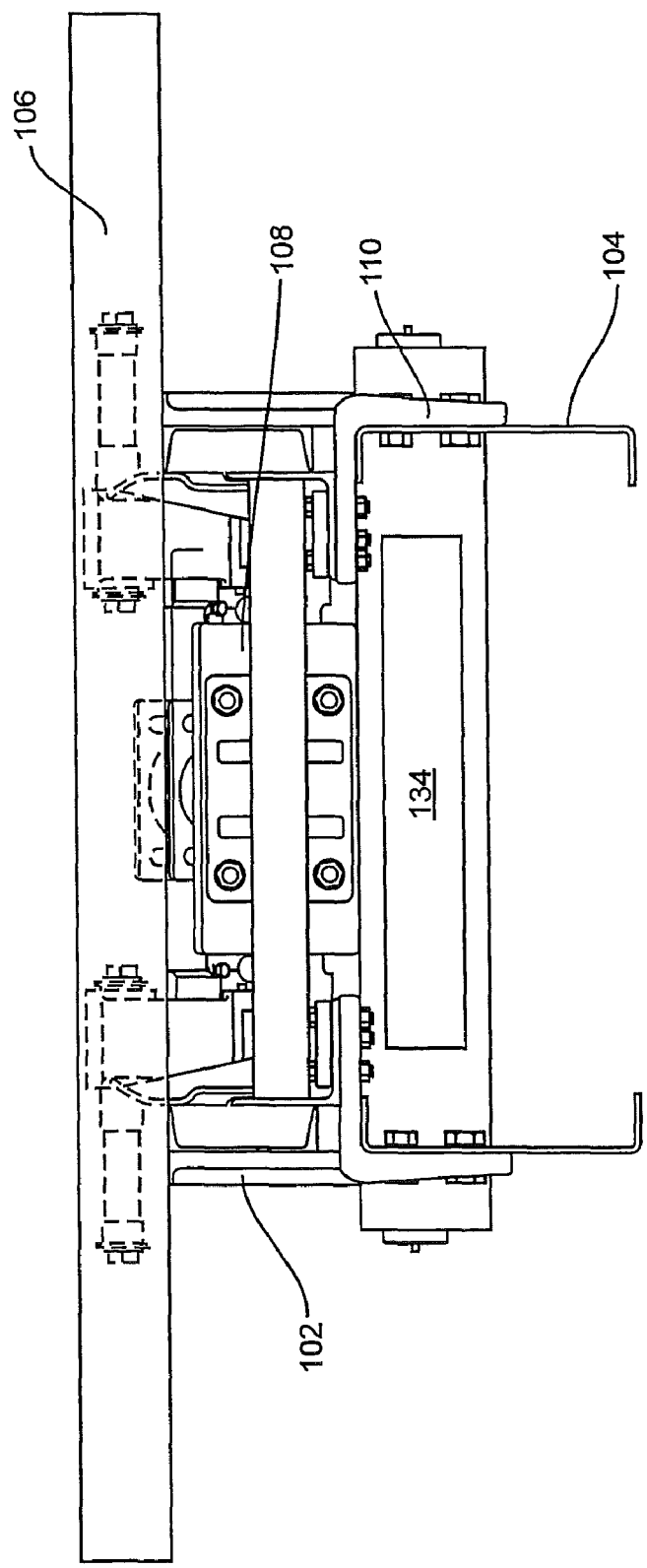
FIG. 3C illustrates an orientation of the hoist shown with respect to FIG. 2 relative to a chassis of the vehicle also shown with respect to FIG. 2 in accordance with an embodiment of the present invention.

As previously discussed, the hoist 102 substantially resides above the vehicle chassis 104 in the illustrated embodiment. FIG. 3C more clearly illustrates an orientation of the hoist 102 relative to the vehicle chassis 104 in accordance with this embodiment. Specifically, the hoist 102 resides above the vehicle chassis 104 such that the hoist 102 does not interfere with any components 134 residing between or below the vehicle chassis 104, where the hoist frame brackets 110 couple the hoist 102 with the vehicle chassis 104. Specifically, these components may include exhaust components, drivetrain components, powertrain components, suspension hanging points, a fuel tank, or the like.

As previously discussed, the hoist 102 includes the cylinder 114. Now making reference to FIG. 4, a more detailed view of the cylinder 114 is shown. The cylinder 114 provides an axial thrust to the hoist 102, such that the torque arm 122 (not shown) and the lift arm 128 (not shown) tilt the dump body 106 (not shown) from a resting position to a dumping position. The cylinder 114 includes multiple pistons, such as pistons 136 and 138, where the pistons 136 and 138 are disposed on the cylinder shaft 116 within the cylinder 114. The piston 136 defines a first cylinder chamber 140 and the piston 138 defines a second cylinder chamber 142. In this embodiment, the overall dimensions of the cylinder 114 are the same as if the cylinder 114 only included a single piston, such that the dimensions of the cylinder 114 are not altered in order to accommodate the pistons 136 and 138.

During operation of the cylinder 114, the pistons 136 and 138 move along an axial direction defined by the cylinder shaft 116, thereby effectuating tilting of the dump body 106. The cylinder 114 also includes a blind end cap 144, a center cap 146, and a rod end cap 148. The blind end cap 144 and the center cap 146, along with the piston 136, define the first cylinder chamber 140. The center cap 146 and the rod end cap 148, along with the piston 138, define the second cylinder chamber 142. The cylinder 114 also includes a cylinder shaft yoke 150 and a blind end pivot 152. The cylinder shaft yoke 150 rotatably couples the cylinder 114 to the cylinder yoke 118. When the pistons 136 and 138 move the cylinder shaft 116, the cylinder shaft yoke 150 causes rotation of the cylinder yoke 118. The blind end pivot 152 couples the cylinder 114 with the lower bunk 120.

Now making reference to FIG. 5A, an even further detailed view of the cylinder 114 is shown. The cylinder 114 includes a T-junction 154 in fluid communication with a runner 156 for the piston 136. The runner 156 is in fluid communication with a cylinder port 158. The cylinder 114 also includes a runner 160, which fluidly communicates the T-junction 154 with an L-junction 162. The L-junction 162 is in fluid communication with a runner 164 for the piston 138. The runner 164 is also in fluid communication with a port 166 for the piston 138.

During operation of the cylinder 114, a fluid, such as hydraulic fluid, air, or the like, feeds into the T-junction 154. The fluid then enters the runner 156 and the cylinder port 158. In addition, as fluid enters the T-junction 154, fluid also passes through the runner 160 and into the L-junction 162. Fluid entering into the L-junction 162 then passes through the runner 164 and into the port 166. Fluid from the cylinder port 158 and the port 166 then enters into the first and second cylinder chambers 140 and 142. As the fluid enters into the first and second cylinder chambers 140 and 142, the pistons 136 and 138 move along a direction X, thereby imparting a linear force along the direction X, as more clearly shown with reference to FIG. 5B. As the pistons 136 and 138 move along the direction X, the cylinder shaft 116 also moves, which in turn causes rotation of the cylinder yoke 118 along with the rotation of the torque arm 122.

Figure 6:
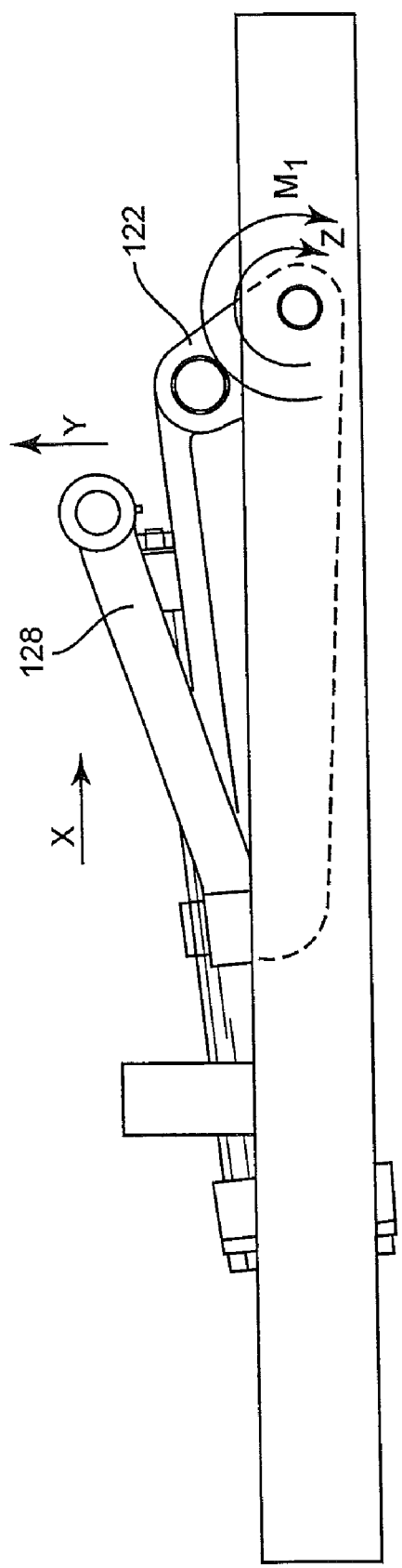
FIG. 6 is a side view of the hoist shown with respect to FIG. 2, in accordance with an embodiment of the present invention.

Now making reference to FIG. 6, as the cylinder yoke 118 rotates, the torque arm 122 also rotates along a direction Z, thereby creating a moment $M_r$. During rotation of the torque arm 122 along the direction Z, the lift arm 128 moves in an upward direction Y. As more fluid enters into the first and second cylinder chambers 140 and 142, the torque arm 122 continues to rotate in the direction Z and the lift arm 128 continues to move in the upward direction Y until the hoist 102 achieves the configuration shown with reference to FIG. 3A, wherein media disposed on the dump body 106 is discharged.

The use of multiple pistons, such as the pistons 136 and 138, in the cylinder 114 increases the overall linear force imparted by the cylinder 114. In particular, in embodiments where a pressurized fluid having a pressure of 3000 psi is used, the use of multiple pistons proportionally increases the linear force imparted by the cylinder 114 without increasing the dimensions of the cylinder. Thus, in embodiments where the cylinder 114 employs the two pistons 136 and 138, the two pistons 136 and 138 effectively double the force the cylinder 114 imparts. In embodiments where the cylinder 114 employs three pistons, the force imparted by the cylinder 114 effectively doubles. As the force imparted by the cylinder 114 increases, the moment acting about the torque arm 122 also increases. Thus, the length of the torque arm 122 does not need to be increased in order to increase the moment acting about the torque arm 122. Furthermore, since neither the dimensions of the cylinder 114 nor the length of the torque arm 122 increase, the dimensions of a hoist, such as the hoist 112, employing the cylinder 114, remain relatively compact.

Figure 7:
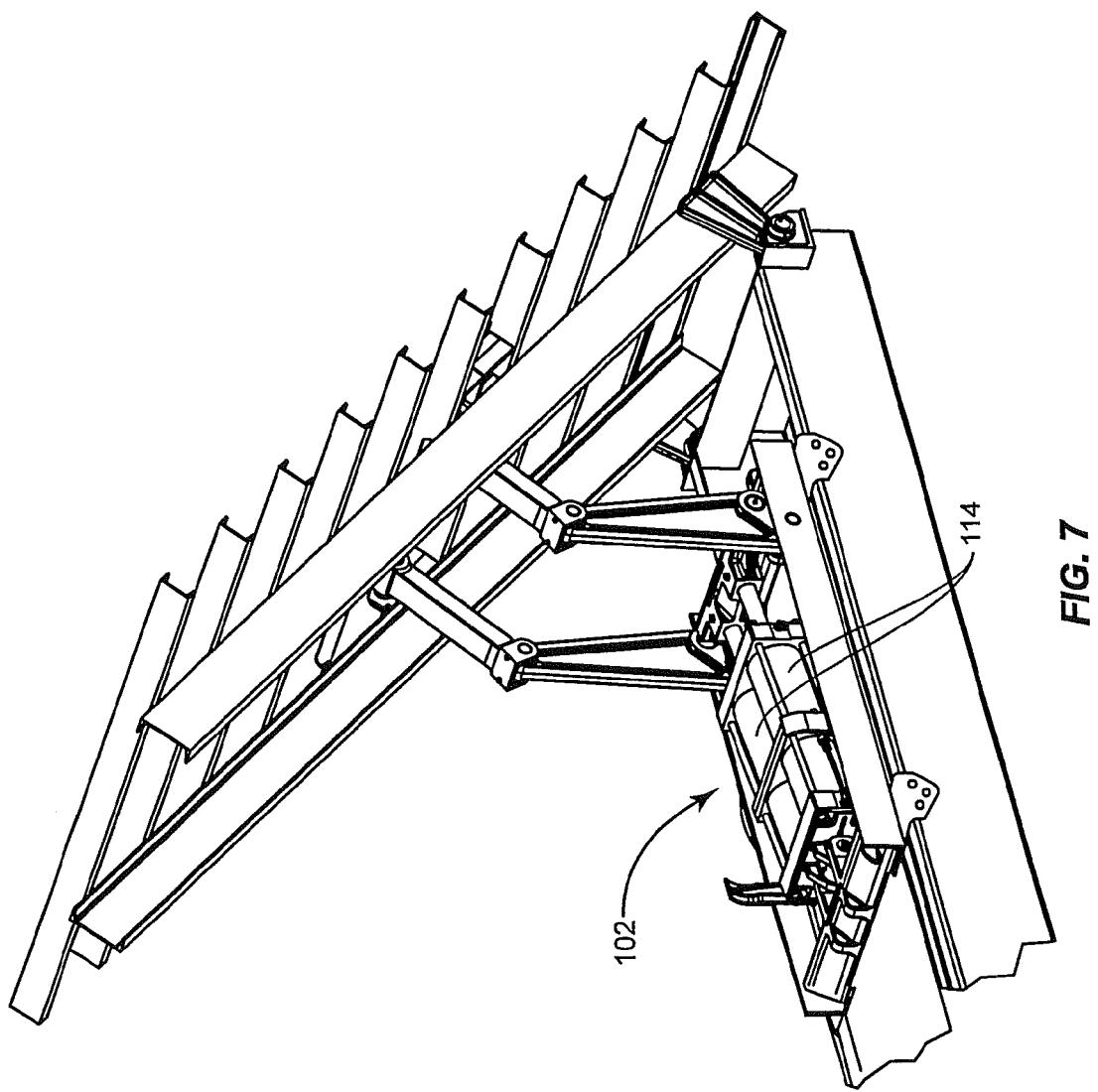
FIG. 7 illustrates a hoist having multiple cylinders, in accordance with a further embodiment of the present invention.
Figure 8:
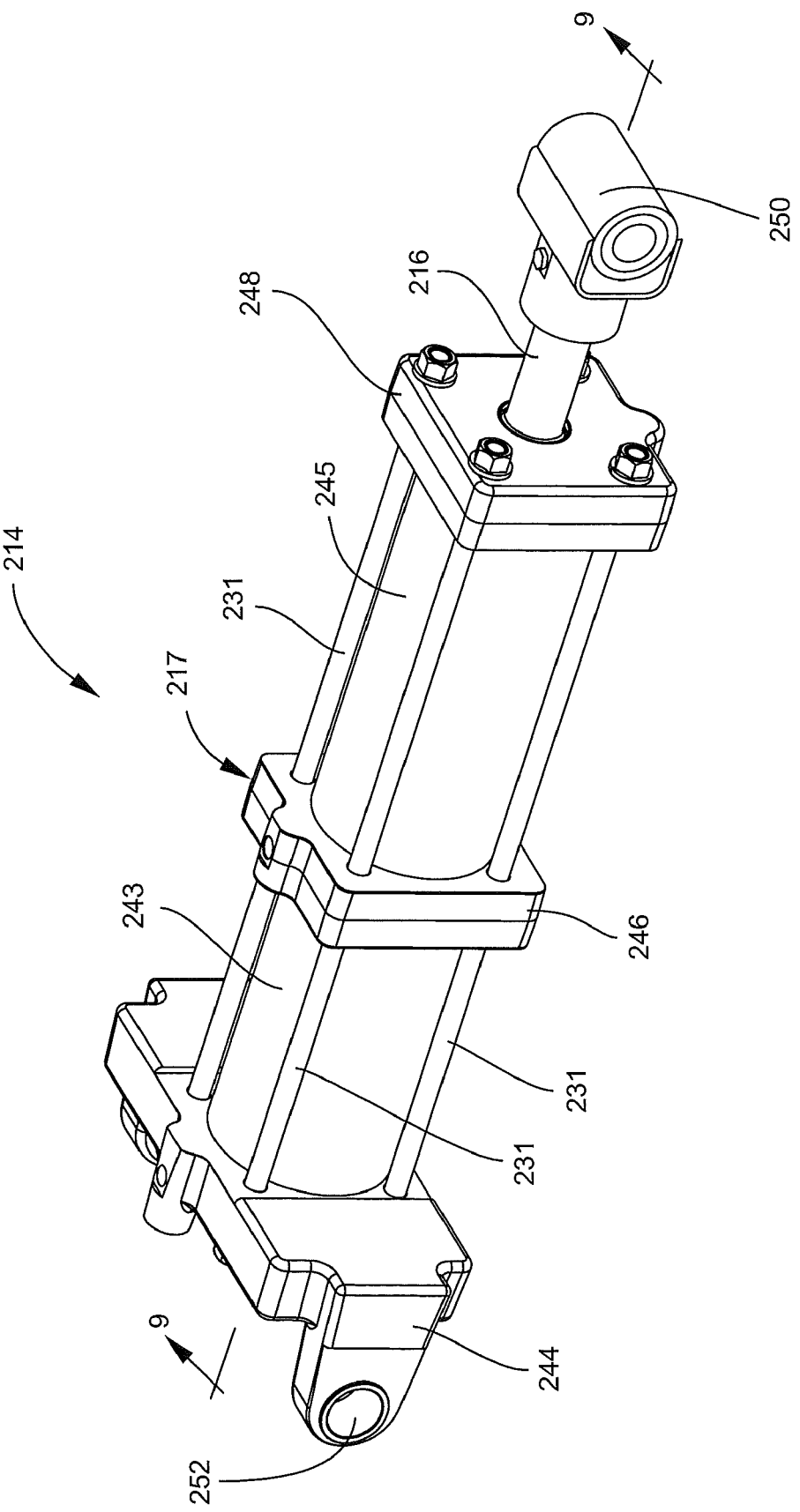
FIG. 8 is a perspective view of a hoist according to further embodiments of the present invention.

In a further embodiment of the present invention, the hoist 102 may include multiple cylinders, where each of the multiple cylinders include multiple pistons, as shown with reference to FIG. 7. In particular, each cylinder has more than one piston as described with reference to FIGS. 4, 5A, and 5B. Furthermore, while the cylinders have been described as having two pistons, each cylinder may have more than two pistons. Thus, the hoist 102 may impart an even greater amount force during operation. For example, if the hoist includes two cylinder 114 each having pistons 136 and 138, the hoist 112 includes a total of four pistons such that the hoist 102 imparts a linear force which is four times greater than a hoist having a single cylinder that only has one piston. In addition, the hoist 102 in FIG. 7 imparts a force which is double the force of a hoist employing two cylinders having only one piston each.

With reference to FIGS. 8-11, a cylinder 214 according to further embodiments of the present invention is shown therein. The cylinder 214 may be incorporated into the hoist 102 in place of and in the same manner as the cylinder 114, and may be operated in the same manner as the cylinder 114 to provide an axial thrust to the hoist 102 to controllably lift and lower the dump body 106. The cylinder 214 may provide improved durability and may be particularly well-adapted to withstand abuse in service, as will be appreciated from the description hereinbelow.

The cylinder 214 includes a cylinder housing assembly 217 and a shaft assembly 219. The housing assembly 217 includes a tubular first cylinder body 243, a tubular second cylinder body 245, a center cap 246, a blind end cap 244, a rod end cap 248, and one or more tie rods 231. The center cap 246 is interposed between the cylinder bodies 243, 245. The blind end cap 244 is located on the end of the first cylinder body 243 opposite the center cap 246. The rod end cap 248 is located on the end of the second cylinder body 245 opposite the center cap 246. The first cylinder body 243, the center cap 246 and the blind end cap 244 collectively define a first cylinder chamber 240. The second cylinder body 245, the center cap 246 and the rod end cap 248 collectively define a second cylinder chamber 242. A blind end pivot 252 is affixed to the blind end cap 244 and couples the cylinder 214 with the lower bunk 120 (FIG. 3A). A cylinder shaft yoke 250 is affixed to the end of the shaft 216 and rotatably couples the cylinder 214 to the cylinder yoke 118 (FIG. 3A). The tie rods 231 are secured to each of and span the end caps 244 and 248. The tie rods 231 may be loaded in tension to apply an axially compressive load to the cylinder bodies 243, 245 and the caps 244, 246, 248 that holds the housing assembly 217 together and which may also assist in sealing the cylinder chambers 240, 242.

The shaft assembly 219 includes a cylinder shaft 216, a first piston 236 and a second piston 238. The shaft assembly 219 is mounted in the cylinder bodies 243, 245 to reciprocate along a thrust axis A-A with portions of the shaft 216 sliding through bores 246B and 248B in the center cap 246 and the end cap 248, respectively. The first piston 236 and the second piston 238 are each affixed to the shaft 216 at respective spaced apart locations along the length of the shaft 216 such that the axial positions of the pistons 236, 238 are fixed with respect to one another and with respect to the shaft 216. The piston 236 is contained in the cylinder chamber 240 between the end cap 244 and the center cap 246. The piston 238 is contained in the cylinder chamber 242 between the end cap 248 and the center cap 246. When the shaft 216 is at least partially extended, the piston 236, the end cap 244 and the cylinder body 243 collectively define a subchamber 240A (FIG. 10) to receive a volume of a positively pressurized drive fluid 205. Similarly, when the shaft 216 is at least partially extended, the piston 238, the end cap 248 and the cylinder body 245 collectively define a subchamber 242A (FIG. 10) to receive a volume of a positively pressurized drive fluid 207.

Figure 9:
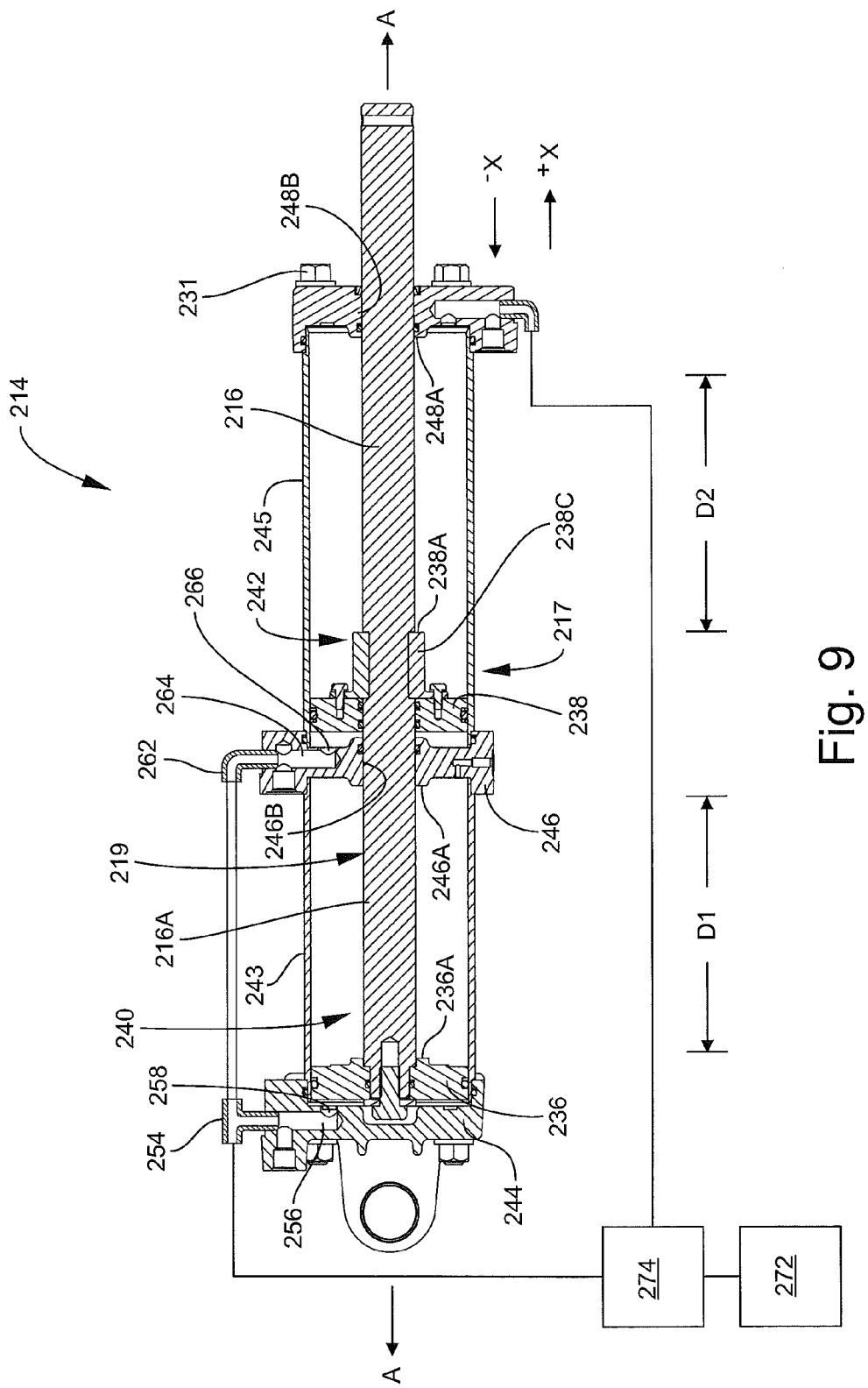
FIG. 9 is a cross-sectional view of the hoist of FIG. 8 taken along the line 9-9, wherein the hoist is in a first, fully retracted position.

With reference to FIG. 9, the cylinder 214 includes a T-junction 254 in fluid communication with a runner 256 to supply pressurized drive fluid, via a cylinder port 258, to the subchamber 240A to displace the piston 236 forward in the direction +X. The cylinder 214 also includes a runner 260, which fluidly communicates the T-junction 254 with an L-junction 262. The L-junction 262 is in fluid communication with a runner 264 to supply pressurized fluid, via a cylinder port 266, to the subchamber 242A to displace the piston 238 forward in the direction +X. The T-junction 254 is in fluid communication with a fluid supply system 270 (schematically illustrated in FIG. 9), which may include a reservoir 272 containing a supply of the drive fluid and a pump or compressor 274 to transfer and pressurize the drive fluid. A reverse port 268 is also fluidly connected to the fluid supply system to supply pressurized fluid to the cylinder chamber 242 between the second piston 238 and the end cap 248 to force the second piston 238 in a direction −X (i.e., opposite the direction +X) to retract the shaft 216. According to some embodiments, the pump or compressor 274 is powered by the engine of the vehicle 100. It will be appreciated that, in accordance with other embodiments, other fluid supply network configurations and fluid pressurizing systems may be employed. The drive fluid may be a hydraulic fluid (e.g., oil) or a gas (e.g., air), for example.

The cylinder 214 may be operated in generally the same manner as described above with regard to the cylinder 114 to controllably raise and lower the dump body 106. With the dump body 106 in its resting position and the cylinder 214 in its corresponding retracted position (as shown in FIG. 9), the compressor 274 is actuated to force the drive fluid into the subchambers 240A, 242A via the ports 258, 266, thereby applying a load to the pistons 236, 238 tending to force the pistons 236, 238 and the shaft 216 in the direction +X along the axis A-A. The shaft 216 imparts a linear force along the direction +X to the cylinder shaft yoke 250. This in turn causes rotation of the cylinder yoke 218 along with the rotation of the torque arm 222 as discussed above with reference to the cylinder 114. As the shaft 216 is extended, the subchambers 240A, 242A expand linearly along the axis A-A as shown in FIG. 10. Ultimately, if the shaft 216 is fully extended, the piston 236 will abut the center cap 246, thereby mechanically limiting further extension of the shaft 216, as shown in FIG. 11.

It is known that dump truck operators sometimes attempt to shake or jostle a fully raised or tilted dump body to shake loose residual media therein. This may be accomplished by fully or nearly fully extending the cylinder, and then releasing and engaging the vehicle transmission (e.g., momentarily engaging and disengaging the clutch) to shake the vehicle and thereby the dump body, for example. As a result, the momentum of the shaken dump body generates a shaft pull force tending to pull the shaft assembly outwardly (i.e., attempt to further or over-extend the shaft in the direction +X relative to the rod end cap (i.e., the cap through which the shaft slides out of the cylinder)). The piston on the shaft abuts the rod end cap so that the jostling tends to pull the rod end cap off of the cylinder housing assembly or otherwise compromise the tie rods, thereby damaging or destroying the housing assembly. When the piston is bottomed out, the fluid drive force generated by the pressurized fluid in the cylinder chamber also tends to push the rod end cap off of the cylinder body. The shaft pull force and the fluid drive force as described can combine to present a force greater than that which the tie rods can withstand. This effect is also present in the case of a dual piston cylinder (e.g., tandem cylinder) wherein the second piston (i.e., the piston in the cylinder chamber proximate the rod end cap) bottoms out against the rod end cap.

Embodiments of the present invention can reduce or eliminate the foregoing problems. In accordance with embodiments of the present invention and as illustrated by the cylinder 214, the cylinder 214 is configured such that at least a portion of the extension fluid drive force on the shaft 216 is offset when the shaft 216 is fully extended so that the net force tending to axially expand the housing assembly 217 is substantially reduced as compared to a single or tandem hoist cylinder as described above. The pistons 236, 238 are relatively spaced apart and the remainder of the cylinder 214 is configured such that the piston 236 will abut the center cap 246 before the piston 238 (including any coupling component 238C) is able to abut the end cap 248. For example, when the cylinder 214 is fully retracted as shown in FIG. 9, the distance D1 between the surfaces 236A and 246A of the piston 236 and the center cap 246 that abut when the shaft 216 is fully extended is less than the distance D2 between the surfaces 238A and 248A of the piston 238 and the rod end cap 248 that would abut if the extension of the shaft 216 were not limited by the abutment between the piston 236 and the center cap 246, thereby ensuring that a gap G (FIG. 11) remains between the surfaces 238A and 248A when the shaft 216 is fully extended. According to some embodiments, the distance D2 is at least 1/16 inch greater than the distance D1 (i.e., the length of the gap G is at least 1/16 inch). According to some embodiments, the gap G has a length in the range of from about 1/16 to 1/4 inch.

The foregoing aspects of the hoist system incorporating the cylinder 214 will now be described with reference to FIGS. 9-11, which illustrate positions of the cylinder 214 at different times throughout a full lift cycle from fully retracted to fully extended. Referring to FIG. 9, the cylinder 214 is shown in a fully retracted position as will be assumed when the dump body 106 is at rest. The fluid supply system 270 is operated as discussed above to force pressurized drive fluid 205, 207 into the subchambers 240A, 242A. The drive fluid generates a fluid drive force against the pistons 236, 238 that drives the shaft 216 in the direction +X with respect to the cylinder bodies 243, 245 and the caps 244, 246, 248 to a partially extended position as shown in FIG. 10 to partially raise or tilt the dump body 106. The fluid supply system 270 is then further operated to force additional pressurized drive fluid 205, 207 into the subchambers 240A, 242A such that the drive fluid drive force further drives the shaft 216 in the direction +X with respect to the cylinder bodies 243, 245 and the caps 244, 246, 248 until the shaft 216 is in its fully extended position (as shown in FIG. 11), wherein the first piston 236 abuts the center cap 246 (i.e., the first piston 236 is bottomed out). The dump body 106 is thereby fully raised or tilted.

As discussed above, with the dump body 106 fully tilted and the shaft 216 fully extended, the vehicle operator may jostle the dump body 106. When the dump body momentum pulls the shaft 216 in the direction +X, the forces acting on the center cap 246, and thereby on the tie rods 231, can be expressed as follows:

$$F_{net} = F_{P1} - F_{P2} + F_S + F_{DB}$$

where:

$F_{P1}$ is the force applied to the center cap 246 in the direction +X by the pressurized fluid 205;

$F_{P2}$ is the force applied to the center cap 246 in the direction −X by the pressurized fluid 207;

$F_S$ is the force applied to the piston 238 by the pressurized fluid 207 in the direction +X, which force is in turn applied to the center cap 246 by the piston 236 via the section 216A of the shaft 216;

$F_{DB}$ is the pull force exerted on the shaft 216 in the direction +X by the dump body 106; and $F_{net}$ is the total net force acting on the center cap 246 and the tie rods 231.

The forces $F_{P1}$, $F_S$ and $F_{DB}$ are axially expansive forces on the cylinder housing assembly 217. That is, the forces $F_{P1}$, $F_S$ and $F_{DB}$ are forces that attempt or tend to expand the housing assembly 217 or axially displace the end caps 244 and 246 with respect to one another, and may also be referred to as the "blowout forces").

A positive $F_{net}$ will exert a force on the housing assembly 217, and in particular, the tie rods 231, tending to axially expand the housing assembly 217 and stretch or dislodge the tie rods 231. The forces $F_{P2}$ and $F_S$ are substantially equal and opposite and therefore cancel one another out, so that the force $F_{net} = F_{P1} + F_{DB}$. Thus, the stress placed on the housing assembly 217 and the tie rods 231 is significantly reduced, providing a substantially more robust cylinder 214 in operation without compromising the total operational output of the cylinder 214.

By way of comparison, when a conventional single piston cylinder of a conventional hoist is bottomed out, the full output force from the pressurized drive fluid in the single cylinder will be applied to the end cap (in the direction +X), combining with the dump body pull force on the shaft to exert a much greater net force tending to pull the cylinder housing assembly apart. Similarly, when a cylinder with dual pistons on a common shaft (tandem) cylinder is configured in conventional manner such that the forward piston bottoms out on the rod end cap, the full output forces from the pressurized drive fluids in each of the two cylinder chambers will be applied to the rod end cap (in the direction +X), combining with the dump body pull force on the shaft to exert a much greater net force tending to pull the housing assembly apart.

According to some embodiments, the net axial expansion force applied to the cylinder housing 217 due to the pressurized drive fluid volumes 205, 207 when the shaft assembly 219 is fully extended is reduced by at least 40% as compared to the corresponding net axial expansion force applied to the cylinder housing by pressurized drive fluid(s) (when the shaft assembly thereof is fully extended) of a conventional single piston cylinder or a tandem cylinder of the same total maximum shaft force output.

Those skilled in the art will recognize improvements and modifications to the preferred embodiments of the present invention. For example, the hoist is not limited to vehicle or dumping applications. The hoist also includes multiple (meaning more than one) pistons. The hoist may include one cylinder or multiple cylinders. All such improvements and modifications are considered within the scope of the concepts disclosed herein and the claims that follow.

That which is claimed is:

1. A vehicle comprising:
    a vehicle chassis;
    a load support body connected to the chassis and movable between a lowered position and a raised position;
    a hoist operable to forcibly move the load support body from the lowered position to the raised position, the hoist including:
        a cylinder including:
            a housing assembly defining first and second cylinder chambers separated by a center cap; and
            a shaft assembly slidably mounted in the housing assembly and including a shaft and first and second pistons affixed to the shaft at axially spaced apart locations along the shaft, wherein the first piston is disposed in the first cylinder chamber and the second piston is disposed in the second cylinder chamber; and
        a pressurized drive fluid supply system operable to supply a pressurized fluid into each of the first and second cylinder chambers to forcibly extend the shaft assembly relative to the housing assembly in an extension direction to forcibly move the load support body from the lowered position to the raised position;

wherein the cylinder is configured such that, when the shaft assembly is fully extended, a volume of the pressurized drive fluid in the second cylinder chamber exerts an offset force on the center cap in a direction opposite the extension direction to offset axially expansive counter-forces on the cylinder housing.

2. The vehicle of claim 1 wherein, when the shaft assembly is fully extended, the first piston abuts the center cap and thereby mechanically limits further extension of the shaft assembly in the extension direction.

3. The vehicle of claim 2 wherein:
the housing assembly includes a rod end cap on an end of the second cylinder chamber opposite the center cap;
the shaft extends through the rod end cap; and
when the shaft assembly is fully extended, the second piston is axially spaced apart from the rod end cap.

4. The vehicle of claim 3 wherein, when the shaft assembly is fully extended, the second piston is axially spaced apart from the rod end cap a distance of at least 1/16 inch.

5. The vehicle of claim 1 wherein:
the cylinder includes at least tie rod configured to resist axial expansion of the housing assembly; and
the offset force reduces an axial expansion load on the at least one tie rod when the shaft assembly is fully extended.

6. The vehicle of claim 1 including a linkage between the cylinder and the load support body, the linkage including:
a torque arm connected to the vehicle chassis and coupled with the cylinder; and
a lift arm coupled with the torque arm and the load support body.

7. The vehicle of claim 5 including a hoist frame bracket affixed to the vehicle chassis, wherein the hoist is coupled to the hoist frame bracket such that the hoist is disposed above the vehicle chassis.

8. The vehicle of claim 1 wherein the vehicle is a dump truck and the load support body is a dump body.

9. A hoist for use with a pressurized drive fluid supply system, the hoist comprising:
a cylinder including:
a housing assembly defining first and second cylinder chambers separated by a center cap; and
a shaft assembly slidably mounted in the housing assembly and including a shaft and first and second pistons affixed to the shaft at axially spaced apart locations along the shaft, wherein the first piston is disposed in the first cylinder chamber and the second piston is disposed in the second cylinder chamber;
wherein the cylinder is configured to receive and direct a pressurized drive fluid from the pressurized drive fluid supply system into each of the first and second cylinder chambers to forcibly extend the shaft assembly relative to the housing assembly in an extension direction; and
wherein the cylinder is configured such that, when the shaft assembly is fully extended, a volume of the pressurized drive fluid in the second cylinder chamber exerts an offset force on the center cap in a direction opposite the extension direction to offset axially expansive counter-forces on the cylinder housing.

10. The hoist of claim 9 wherein, when the shaft assembly is fully extended, the first piston abuts the center cap and thereby mechanically limits further extension of the shaft assembly in the extension direction.

11. The hoist of claim 10 wherein:
the housing assembly includes a rod end cap on an end of the second cylinder chamber opposite the center cap;
the shaft extends through the rod end cap; and
when the shaft assembly is fully extended, the second piston is axially spaced apart from the rod end cap.

12. The hoist of claim 11 wherein, when the shaft assembly is fully extended, the second piston is axially spaced apart from the rod end cap a distance of at least 1/16 inch.

13. The hoist of claim 9 wherein:
the cylinder includes at least tie rod configured to resist axial expansion of the housing assembly; and
the offset force reduces an axial expansion load on the at least one tie rod when the shaft assembly is fully extended.

14. The hoist of claim 9 including a linkage including:
a torque arm coupled with the cylinder and adapted to be connected to a vehicle chassis of a vehicle; and
a lift arm coupled with the torque arm and adapted to be connected to a load support body of the vehicle.

15. The hoist of claim 14 including a hoist frame bracket, wherein the hoist is coupled to the hoist frame bracket such that, when the hoist frame bracket is mounted on the vehicle chassis, the hoist is disposed above the vehicle chassis.

* * * * *